(12) United States Patent
Bysiewicz

(10) Patent No.: US 8,950,758 B2
(45) Date of Patent: Feb. 10, 2015

(54) WHEELBARROW SLED SYSTEM

(71) Applicant: Katherine S. Bysiewicz, Madison, CT (US)

(72) Inventor: Katherine S. Bysiewicz, Madison, CT (US)

(*) Notice: Subject to any disclaimer, the term of this patent is extended or adjusted under 35 U.S.C. 154(b) by 0 days.

(21) Appl. No.: 13/866,393

(22) Filed: Apr. 19, 2013

(65) Prior Publication Data

US 2013/0277925 A1    Oct. 24, 2013

Related U.S. Application Data

(60) Provisional application No. 61/636,438, filed on Apr. 20, 2012, provisional application No. 61/775,660, filed on Mar. 10, 2013.

(51) Int. Cl.
*B62B 19/02* (2006.01)
*B62B 13/18* (2006.01)

(52) U.S. Cl.
CPC ............... *B62B 13/18* (2013.01); *B62B 19/02* (2013.01)
USPC ............................. 280/13; 280/845; 280/23.1

(58) Field of Classification Search
CPC ............ B62B 1/00; B62B 1/18; B62B 19/00; B62B 19/02; B62B 19/04; B62B 13/00; B62B 13/02; B62B 13/06; B62B 13/18; B62B 17/00
USPC ............. 280/13, 845, 23.1, 28, 28.12, 28.17, 280/900, 8
See application file for complete search history.

(56) References Cited

U.S. PATENT DOCUMENTS

| | | | | |
|---|---|---|---|---|
| 77,485 | A * | 5/1868 | Herrick | 280/10 |
| 126,108 | A * | 4/1872 | Townsend | 280/23.1 |
| 387,327 | A * | 8/1888 | Taicher | 280/8 |
| 396,646 | A * | 1/1889 | Carhart | 280/23.1 |
| 974,571 | A * | 11/1910 | Johnson | 280/23.1 |
| 1,012,043 | A * | 12/1911 | Yack | 280/23.1 |
| 1,270,495 | A * | 6/1918 | Christensen | 280/23.1 |
| 1,423,732 | A * | 7/1922 | Pixley | 280/23.1 |
| 1,929,819 | A * | 10/1933 | Johnson | 280/144 |
| 2,155,714 | A * | 4/1939 | Kidder | 280/23.1 |
| 2,380,162 | A * | 7/1945 | Germain | 280/8 |
| 2,398,142 | A * | 4/1946 | Hnat | 280/9 |
| 2,468,470 | A * | 4/1949 | Spieth | 280/24 |
| 2,523,950 | A * | 9/1950 | Golubics | 280/13 |

(Continued)

FOREIGN PATENT DOCUMENTS

CA    2249107 A1 *   4/2000
FR    2969104 A1 *   6/2012

(Continued)

OTHER PUBLICATIONS

Admitted prior art product sheet "COOP Laser Luge", http://www.coop-sport.com/snow/snow-sleds/laser-luge.aspx, downloaded Apr. 19, 2013, SwimWays Corp., Virginia Beach, VA.

*Primary Examiner* — J. Allen Shriver, II
*Assistant Examiner* — Steve Clemmons
(74) *Attorney, Agent, or Firm* — Bachman & LaPointe, P.C.

(57) ABSTRACT

An accessory is provided for a wheelbarrow. The wheelbarrow has: a wheel; a tray; a pair of handle members supporting the tray relative to the wheel and extending rearward past the tray; and a pair of legs for cooperating with the wheel to support the wheelbarrow in a parked condition. The sled has a left runner and a right runner each mounted at a first location relative to one or both of the legs and mounted at a forward location.

17 Claims, 3 Drawing Sheets

(56) References Cited

U.S. PATENT DOCUMENTS

| | | | |
|---|---|---|---|
| 2,530,240 A * | 11/1950 | Graham | 280/13 |
| 2,577,459 A * | 12/1951 | Gellenbeck | 280/8 |
| 2,598,682 A * | 6/1952 | Giovannoni | 280/14 |
| 2,853,307 A * | 9/1958 | Dombrowski | 280/13 |
| 3,367,674 A * | 2/1968 | Puhl | 280/13 |
| 4,832,357 A * | 5/1989 | Crew | 280/304.1 |
| 5,348,322 A | 9/1994 | Rauf et al. | |
| 5,368,281 A | 11/1994 | Skyba | |
| 5,407,217 A * | 4/1995 | Lambert et al. | 280/10 |
| 5,413,361 A * | 5/1995 | Mosher | 280/7.12 |
| 5,551,714 A | 9/1996 | Rauf et al. | |
| 5,553,875 A * | 9/1996 | Ulicne et al. | 280/20 |
| 5,722,640 A | 3/1998 | Skyba | |
| 5,924,708 A | 7/1999 | Bisaillon et al. | |
| 6,149,133 A | 11/2000 | Skyba | |
| 6,708,989 B1 * | 3/2004 | Braun | 280/7.12 |
| 7,284,762 B2 * | 10/2007 | Mehtonen | 280/19.1 |
| 7,731,222 B2 * | 6/2010 | Whiteley et al. | 280/656 |
| 2001/0033076 A1 * | 10/2001 | Cummings | 280/845 |
| 2004/0262462 A1 | 12/2004 | Polak et al. | |
| 2011/0101634 A1 * | 5/2011 | Love | 280/13 |

FOREIGN PATENT DOCUMENTS

| | | | |
|---|---|---|---|
| GB | 111070 A * | 11/1917 | |
| GB | 2323338 A * | 9/1998 | B62B 13/16 |
| JP | 3176912 U * | 7/2012 | |

* cited by examiner

# US 8,950,758 B2

WHEELBARROW SLED SYSTEM

CROSS-REFERENCE TO RELATED APPLICATIONS

Benefit is claimed of U.S. Patent Applications Ser. No. 61/636,438, filed Apr. 20, 2012 and Ser. No. 61/775,660, filed Mar. 10, 2013, and both entitled "Wheelbarrow Sled System", the disclosures of which are incorporated by reference herein in their entireties as if set forth at length.

BACKGROUND OF THE INVENTION

The invention relates to wheelbarrows. More particularly, the invention relates to wheelbarrow use in snow.

A typical wheelbarrow 20 has a tray or bucket 22 supported by a front wheel 24 (typically a single central front wheel). In an exemplary configuration, the wheelbarrow has a pair of rear legs 26A, 26B for supporting it when not in use. To use the wheelbarrow, a pair of handles 28A, 28B project rearwardly and terminate in grips 30A, 30B which may be gripped by a user to lift the legs off engagement with the ground and roll the wheelbarrow using the wheel. A typical configuration has the handles as structural members extending forwardly from the grips under the tray and secured to the tray to support the tray and proceeding forward to journals or brackets 32 mounting opposite ends of an axle 34 supporting the wheel. At their forward ends 36A, 36B, the handles may be joined by a bracket 40 which serves as a wheel guard immediately in front of the wheel. Typical handles are wood, typical trays are metallic (e.g., steel) or plastic, and typical legs and other braces are metallic. A typical wheel is metallic or plastic and has a pneumatic rubber tube-type tire 42.

Various proposals have been made to adapt wheelbarrows for use in snow. One exemplary proposal is seen in U.S. Pat. No. 3,367,674 of Puhl which discloses a ski mountable to the wheel. Additionally, U.S. Pat. No. 5,924,708 of Bisaillon and Bisaillon discloses a two-wheel wheelbarrow in which the wheels may be replaced by skis.

SUMMARY OF THE INVENTION

An accessory is provided for a wheelbarrow. The wheelbarrow has: a wheel; a tray; a pair of handle members supporting the tray relative to the wheel and extending rearward past the tray; and a pair of legs for cooperating with the wheel to support the wheelbarrow in a parked condition. The sled has a left runner and a right runner each mounted at a first location relative to one or both of the legs and mounted at a forward location.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
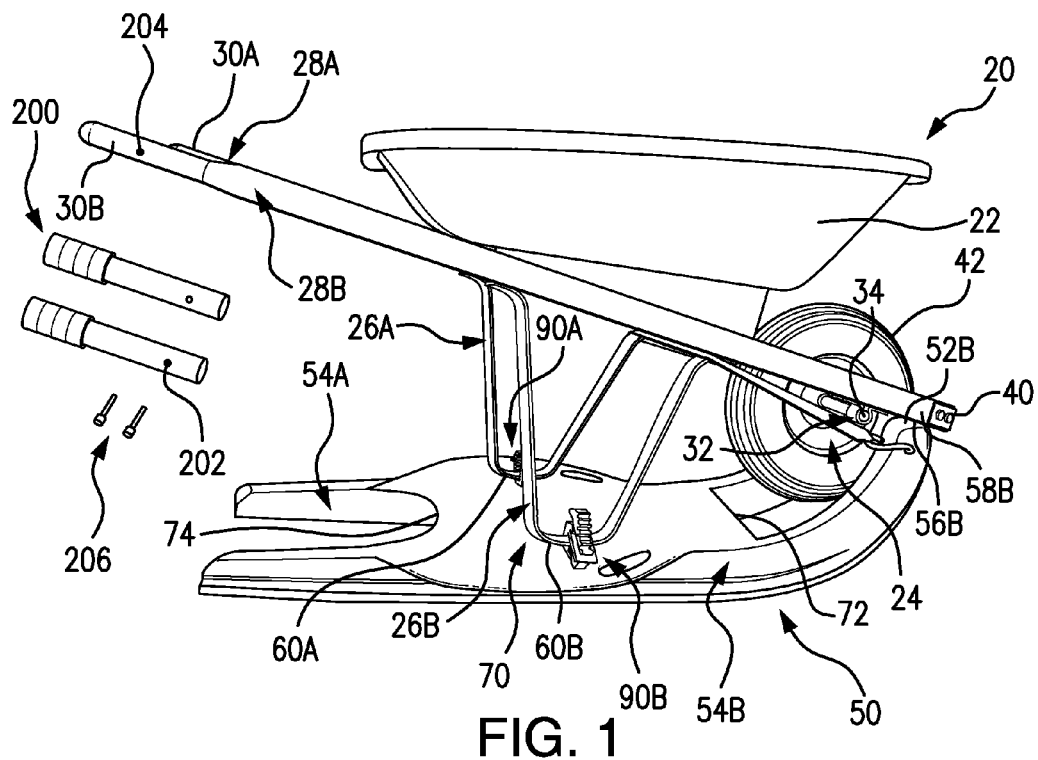
FIG. 1 is a right side view of a wheelbarrow installed on a sled system.
Figure 2:
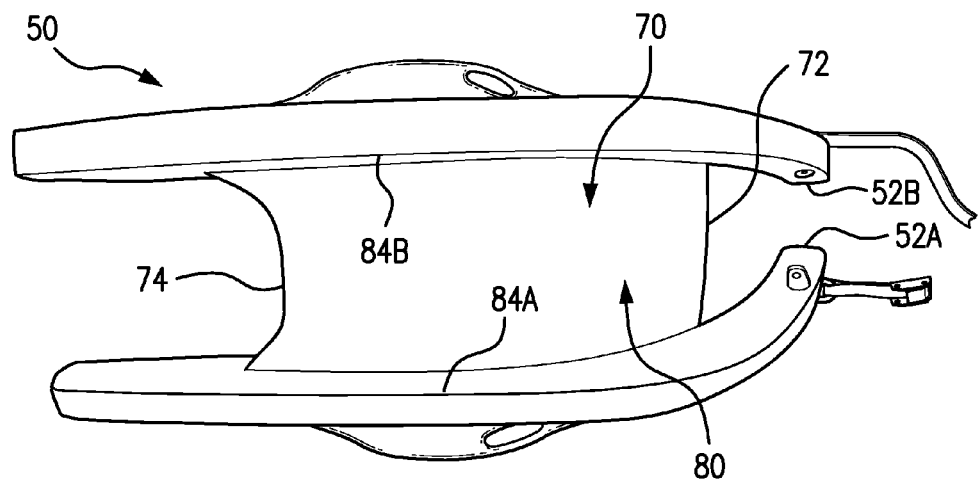
FIG. 2 is a bottom view of the sled system of FIG. 1.

An exemplary prototype wheelbarrow sled accessory 50 is based on a conventional snow luge. The figures illustrate a sled based on a molded plastic snow luge sold under the trademark COOP LASER LUGE. A somewhat similar luge with the addition of a metal frame is found in U.S. Pat. No. 5,551,714 of Rauf et al.

Coincidentally, the COOP LASER LUGE snow luge is of approximate dimensions to mate with a wheelbarrow. The parent applications show photographs of a prototype based on this prior art luge formed by cutting away a rear portion of the seat and adding mounting features. The present drawings show a slightly further modified prototype sled. With this prototype, the forward ends 52A, 52B of the two runners 54A, 54B engage the undersides 56A, 56B of forward portions 58A, 58B of the handles 28A, 28B near the wheel (e.g., immediately in front of or immediately aft of the axle brackets 32). A wheelbarrow with relatively narrow width between legs 26A, 26B may have the undersides 60A, 60B of such legs engaging the sled (e.g., shown in the parent applications as the lateral handle portions of the prior art luge at either side of the seating area). In the original snow luge, the luge seat protrudes rearward. In a modified wheelbarrow sled configuration, the seat may become a mere structural cross-member holding the rails spaced apart. In a further modification beyond the prior art luge, this cross-member 70 may extend much further forward than the former seat to form a snow ramp extending along a substantial length of the runners aft from a leading edge 72 to a trailing edge 74. The leading edge 72 may be positioned to be very close behind the largest anticipated tire size. The exemplary ramp has an upper layer and a lower layer. Along a forward portion 80 of the ramp (extending forward beyond the original seat of the luge) a forwardly tapering separation of the two layers defines a forwardly tapering thickness of the ramp. Laterally, the sled may include carry handles 100.

The underside of the ramp remains, however, spaced upwardly from the adjacent lower edges 84A, 84B of the rails (e.g., by several centimeters). In an exemplary embodiment, due to the presence of the ramp's tapering thickness, the upward spacing of the ramp underside may rearwardly decrease from a peak value well in excess of several centimeters (e.g., at least eight centimeters, more narrowly, eight to fifteen centimeters or about nine centimeters) tapering to a lower value of perhaps only several centimeters (e.g., at least three centimeters, more particularly, three to six centimeters). The ramp also serves as a shield resisting tendency of snow to pass over the cross-member.

The rear portion of the seat of the original snow luge may thus be eliminated (e.g., and replaced with a concavity at the trailing edge 74). This accommodates the user's feet when walking.

A further difference that the illustrated wheelbarrow sled 50 has relative to the luge of the parent applications is a wider platform to engage/accommodate the wheelbarrow legs (more particularly, to accommodate a wider variety of separations of legs). The sled also includes mounting features 90A, 90B for engaging the legs to releasably and reattachably secure the sled to the legs (e.g., with the sled being secured at the location of the undersides/bottoms of the legs). The exemplary embodiment features respective left and right clamps, namely, one-piece molded clamps. The clamps each comprise a generally U-shaped main body 96 secured to the luge and having a strap portion 92 extending from one leg of the U and adjustably couplable to the other leg of the U. Exemplary clamps are shown in US Pregrant Publication 2004/

0262462A1 and are sold under the trademark QUICK FIST by End of the Road, Inc. of Nashville, Tenn. Alternative exemplary mounting features include a pair of straps for the respective pair of legs with each strap passing through its associated leg and being secured thereto via an associated buckle or clamp.

The illustrated exemplary clamps are fastened (bolted or screwed) to the cross-member inboard of handle portions 100. These handle portions may be spaced slightly further outboard than the handles of the baseline snow luge. The resilient compliance of the exemplary elastomeric clamps and their adjustability allow accommodation of a decent range of wheelbarrows even without provision for further adjustability (e.g., without making the clamp-to-clamp separation adjustable such as by having multiple mounting locations for the clamps). Alternative configurations involve a single leg-retaining member (e.g., a bar) spanning through both legs and secured at opposite lateral ends.

Figure 3:
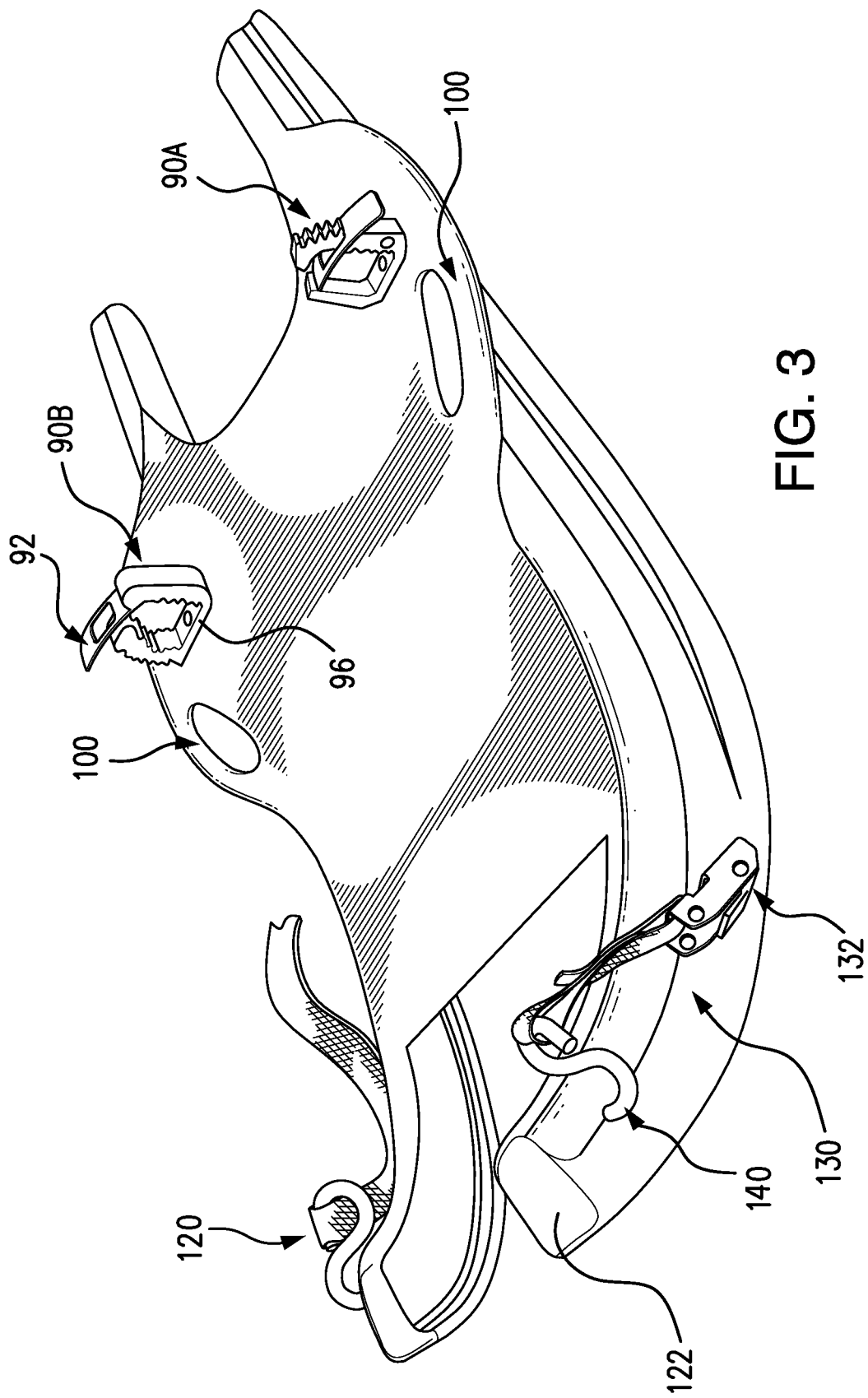
FIG. 3 is a front left downward view of the sled system of FIG. 2.
Figure 4:
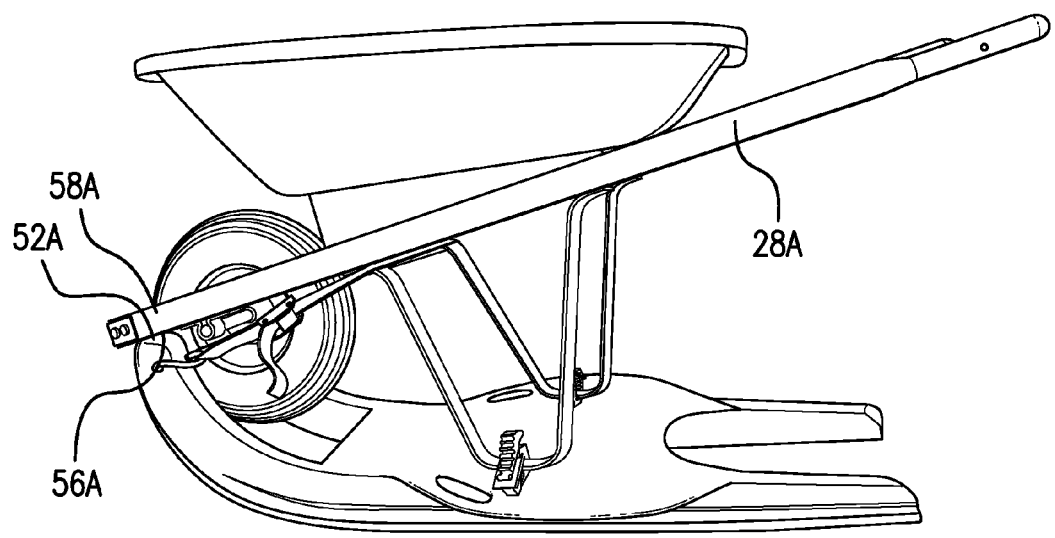
FIG. 4 is a left side view of the installed wheelbarrow.

Additional mounting features (means) 120 (FIG. 3) may be provided for releasably/reattachably forward mounting of the runners. For example, upper surfaces 122 of the front ends 52A, 52B of the runners may contact the underside 56A, 56B of forward portions of the respective handles (e.g., at the extreme front ends of the handles, slightly recessed toward the axle, at the axle, or slightly aft of the axle). Balance may favor a relatively forward one of these mounting locations. Alternatively, the runners may mount to the axle or to the wheel guard. The mounting means 120 may include one or more straps (e.g., a single central strap assembly 130 or one strap for each runner and handle), the straps having buckles 132 or clamps. Alternative implementations may create dedicated mounting features on front and/or rear on the wheelbarrow (e.g., pre-formed holes, lugs, or the like). The illustrated implementation uses a single strap/buckle. An alternative in the parent applications uses a single rope tie-down system wherein a releasable ratchet is used to tighten the rope.

One end of the strap or rope system may be attached via a hook 140 to one runner and the other end may be similarly attached to the other runner. In assembly, one end may be unhooked and then routed appropriately to secure the wheelbarrow to the sled and then reconnected. The strap/rope may be tightened and locked/latched to maintain engagement of the runner forward ends to the wheelbarrow. The exemplary routing involves routing the strap/rope behind the wheel behind forward branches of the legs so that the strap/rope becomes wedged between the legs and the undersides of the handles or is just held against those branches depending on leg geometry. Exemplary tie-downs are those shown in U.S. Pat. Nos. 5,368,281 and 6,149,133 and those sold under the trademark ROPE RATCHET by Carolina North Manufacturing, Inc. of Kernersville, N.C. To remove the wheelbarrow from the sled, the buckle(s) or ratchet may be released (e.g., by pressing a release button or shifting a release lever) allowing the strap/rope to extend and a hook to be disengaged. The clamp straps may also be disengaged.

Unloading of the wheelbarrow may be performed by lifting up on the handles to rotate the wheelbarrow forward on the runners. The runners may be positioned so that there is a smooth transition between the runners contacting the ground and the wheel guard contacting the ground in a final stage of lifting. The wheel may protrude beyond the runners so that this transition may include a stage where the wheelbarrow is supported by the wheel (at least if on a flat/hard surface). This allows the wheelbarrow to be wheeled over dry surfaces (e.g., to move along concrete or pavement or other dry surface on the way to or from a snow-covered use location or across such a surface when traversing between snow covered locations).

The sled may provide a less concentrated distribution of weight, thus encouraging stability in the snow (e.g., if sideways on a slope, the downslope runner will not sink as deep as the downslope leg alone would). The exemplary runners protrude substantially behind the rearward extremes of the bottoms of the legs (e.g. in excess of 20 cm, more broadly in excess of 30 cm or 40 cm). That substantial extension may help with reduced weight distribution, but is optional. To maintain at least similar stability to the baseline wheelbarrow, the runners should extend at least about to the rearward extremes of the leg bottoms.

Other potential differences relative to the snow luge involve the cross-member. First, whereas forward portions of the snow luge runners are intended to be laterally flexed by the user in order to steer, this need not be the case with the wheelbarrow sled (although depending upon configurations some degree of lateral flexibility may be useful for accommodating different wheelbarrows). Thus, the cross-member of the wheelbarrow sled may be relatively forward and/or there may be multiple such cross-members or other differences relative to the luge. Additionally, to not plow soft snow through which the wheelbarrow sled is being used, the underside of the cross-member may be further elevated relative to that of the luge. This may be in contrast to the cross-member of the snow luge which is low so as to form the portion of the seat and give the user a low center of gravity.

In use, there may be several advantages over single front ski devices such as in the aforementioned prior art patents. With a single front ski, one must maneuver the wheelbarrow similarly to when using the wheel. One lifts up on the handles and then pushes forward. However, this action may have a tendency to drive the front end of the wheelbarrow downward exacerbating the fact that much of the weight is on the relatively forward single ski. This may cause the ski to merely embed in the snow. With longer runners extending back toward the legs, there may be distribution of weight with less pressure on the snow. Additionally, one need not lift up on the handles (or at least not as much). This allows the wheelbarrow to glide over the snow without diving. Even moreso, one has the option of pushing downward on the handles to keep the front end up and make sure that the wheelbarrow glides over the snow rather than driving into the snow.

The luge-like runners have lower surfaces which are angled upward from inboard-to-outboard (measured laterally as viewed from the front or the rear). When this is preserved in the wheelbarrow sled, it helps maintain lateral stability and maneuverability. Other profiles, including ski-like profiles, are, however, possible.

In the exemplary embodiment, a center-to-center separation of the runner front end portions supporting the handles is approximately six inches (15 cm, more broadly, 12-18 cm) with a gap separation of approximately four inches (e.g., 10 cm, more broadly, 8-15 cm). An exemplary height of the front end portions above a flat surface on which the sled rests is approximately ten inches (25 cm, more broadly, 20 cm-30 cm). An exemplary height of the feet support locations is approximately six inches (15 cm, more broadly, 10-20 cm). An exemplary contact point separation between the front end portions supporting the handles and the feet supporting surfaces is 25 inches (64 cm, more broadly, 50-70 cm) on each side. An exemplary separation between the rear supporting surfaces is seventeen inches (43 cm, more broadly, 40-50 cm). In embodiments with such a ramp surface, an exemplary overall length of the cross-member may be at least one third of the overall length of the sled (e.g., 20-70%). The leading edge of the ramp may come within five inches (13 cm) of many wheels, more narrowly, within two inches (2.5 cm) and, more narrowly, within about 2 cm of a relatively large tire. With such a close spacing, if the tire acquires accumulations of snow from contacting the snow, the leading edge of the ramp may tend to remove (scrape away) the snow.

Among further variations, are versions intended to accommodate two-wheel wheelbarrows or versions with sufficient adjustability to accommodate both two-wheel and one-wheel wheelbarrows. This might include telescoping or otherwise extensible/retractable or otherwise adjustable cross members.

Additional variations may reflect duty and service grade (e.g., along a spectrum between a light duty consumer model for light loads and infrequent use to a heavy duty commercial model for heavier loads and/or frequent use). Such duty variations might include a variety of internal and external reinforcements, wear-resistant inserts or other surface members, and the like.

The sled may also be used with handle extensions 200 (FIG. 1, e.g., tubular extensions having holes 202 complementary to holes 204 drilled in the handles for receiving removal pins 206 to lock the two together). The handle extensions address the problem of the rear ends of the runners interfering with the user's feet. They also provide more leverage to raise the front end off of snow and turn the wheelbarrow through sharp turns.

As discussed above, a conventional wheelbarrow may be obtained from conventional sources and made via conventional manufacturing techniques and materials. The exemplary sled may be formed by molding (e.g., blow molding, vacuum molding, or injection molding) of a plastic material (e.g., polyethylene, ABS, or the like). This may be molded in one piece or multiple pieces then assembled via adhesive, solvent welding, or thermal welding. Alternatives involve fiber-reinforced composites (e.g., fiberglass, carbon fiber, aramid fiber, and the like) formed by conventional layup techniques. This material may form a shell which may be hollow or foam-filled. Structural and wear reinforcements (if any) may be incorporated after molding and/or may be included in the molding and may be made via appropriate metal forming techniques of appropriate metals (e.g., stainless steel and aluminum alloys). Fittings may be attached after molding or may be incorporated into the molding process.

One or more embodiments of the present invention have been described. Nevertheless, it will be understood that various modifications may be made without departing from the spirit and scope of the invention. For example, considerations of the service grade will influence any particular implementation. Accordingly, other embodiments are within the scope of the following claims.

What is claimed is:

1. An apparatus comprising:
   a wheelbarrow having:
     a wheel;
     a tray;
     a pair of handle members supporting the tray relative to the wheel and extending rearward past the tray; and
     a pair of legs for cooperating with the wheel to support the wheelbarrow in a parked condition; and
   a sled comprising:
   a left runner and a right runner each runner mounted at an associated first location to one or both of the legs and mounted to the wheelbarrow at an associated second location forward of the first location.

2. The apparatus of claim 1 wherein:
   a cross-member connects the runners and is unitarily formed therewith.

3. The apparatus of claim 2 wherein:
   the runners and cross-member comprise a fiber composite shell or molded plastic shell.

4. The apparatus of claim 1 further comprising:
   first means for releasably and reattachably securing forward portions of the runners to the wheelbarrow at said associated second location; and
   second means for releasably and reattachably securing the sled to the legs at the associated first location.

5. The apparatus of claim 4 wherein:
   the first means comprises a rope or strap system with a ratchet or buckle; and
   the second means comprises a pair of clamps.

6. The apparatus of claim 1 wherein:
   the runners extend rearwardly beyond bottoms of the legs.

7. The apparatus of claim 1 wherein:
   the sled supports undersides of the handle members or supports a front wheel guard of the wheelbarrow.

8. The apparatus of claim 1 wherein:
   the runners converge toward the forward end of the sled.

9. The apparatus of claim 1 wherein:
   undersides of the runners are angled upwardly from inboard-to-outboard.

10. The apparatus of claim 1 wherein:
    a cross-member of the sled forms a ramp surface having a length of at least a third of a length of the sled.

11. The apparatus of claim 10 wherein:
    the ramp surface is spaced upwardly from lower edges of the runners.

12. The sled of claim 1 wherein:
    the left runner and right runner curve upwardly at a forward location, with a top surface of the upwardly curved forward location supporting undersides of the handle members or a front guard of the wheelbarrow.

13. A method of modifying a wheelbarrow, the method comprising:
    providing a wheelbarrow having:
      a wheel;
      a tray;
      a pair of handle members supporting the tray relative to the wheel and extending rearward past the tray; and
      a pair of legs for cooperating with the wheel to support the wheelbarrow in a parked condition;
    providing a sled having:
      a left runner and a right runner; and securing the left and right runners to the wheelbarrow, the securing including a first securing near forward ends of the runners and a second securing to the legs of the wheelbarrow.

14. The method of claim 13 wherein:
    the second securing to the legs comprises securing left and right straps through respective left and right said legs.

15. The method of claim 13 wherein:
    the securing to legs comprises inserting one or more members through left and right said legs.

16. The method of claim 15 wherein:
    the inserting one or more members comprises engaging said left leg with a left clamp and said right leg with a right clamp.

17. A sled for supporting a wheelbarrow, the sled comprising:
    a left runner;
    a right runner;
    means for mounting legs of the wheelbarrow; and
    means for mounting a forward end of the wheelbarrow, the left runner and right runner curve upwardly at a forward location, with a top surface of the upwardly curved forward location supporting undersides of the handle members or a front guard of the wheelbarrow.

\* \* \* \* \*